(12) United States Patent
Haggar et al.

(10) Patent No.: US 8,150,997 B2
(45) Date of Patent: Apr. 3, 2012

(54) TECHNIQUE FOR EFFICIENT DATA TRANSFER WITHIN A VIRTUAL NETWORK

(75) Inventors: Jeffrey Douglas Haggar, Holly Springs, NC (US); Jerry Wayne Stevens, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 3821 days.

(21) Appl. No.: 09/841,136

(22) Filed: Apr. 24, 2001

(65) Prior Publication Data

US 2002/0156915 A1 Oct. 24, 2002

(51) Int. Cl.
*G06F 15/173* (2006.01)
*G06F 15/16* (2006.01)
*G06F 9/34* (2006.01)
*H04L 12/28* (2006.01)
*H04L 12/66* (2006.01)

(52) U.S. Cl. ........ 709/238; 709/230; 709/232; 709/243; 370/355; 370/351; 370/396; 711/202

(58) Field of Classification Search ............... 709/230, 709/232, 238, 243; 370/230, 229, 232, 238, 370/355, 356, 351, 396; 711/202
See application file for complete search history.

(56) References Cited

U.S. PATENT DOCUMENTS

| | | | | | |
|---|---|---|---|---|---|
| 4,872,159 | A | * | 10/1989 | Hemmady et al. | 370/352 |
| 5,522,045 | A | * | 5/1996 | Sandberg | 709/215 |
| 5,854,903 | A | * | 12/1998 | Morrison et al. | 709/249 |
| 6,016,496 | A | * | 1/2000 | Roberson | 707/103 R |
| 6,141,738 | A | * | 10/2000 | Munter et al. | 711/206 |

OTHER PUBLICATIONS http://ww-1.ibm.com/servers/eserver/zseries/networking/ "IBM Networking", 1 page. "IBM IBMeServer zSeries 900 and z/OS", 2 pg.
"IBM eServer z Series, Enterprise Servers", 1 pg. "IBM eServer z Series: Networking—Hipersockets", 1 pg.
"IBM Reinvents Mainframe and Marketplace", Oct. 3, 20001, 3 pg.

\* cited by examiner

*Primary Examiner* — Asghar Bilgrami
(74) *Attorney, Agent, or Firm* — Cuenot, Forsythe & Kim, LLC

(57) ABSTRACT

Methods, systems, and computer program products for improving the efficiency of data transfer within interconnected components of a virtual network, and in particular components of a single physical computing device, where the components exchange data as if they were communicating over an actual communications network using networking protocols. Data packets to be sent from one component to another are buffered by next-hop address (and optionally by final destination address as well) to improve efficiency of packet delivery.

21 Claims, 6 Drawing Sheets

FIG. 4A
| | 401 | 402 |
|---|---|---|
| | Next Hop | Data |
| 405 | 123 | abc |
| 406 | 456 | xyz |
| 407 | 123 | pqr |
| 408 | 456 | mld |
| 409 | 789 | rah |
FIG. 4B
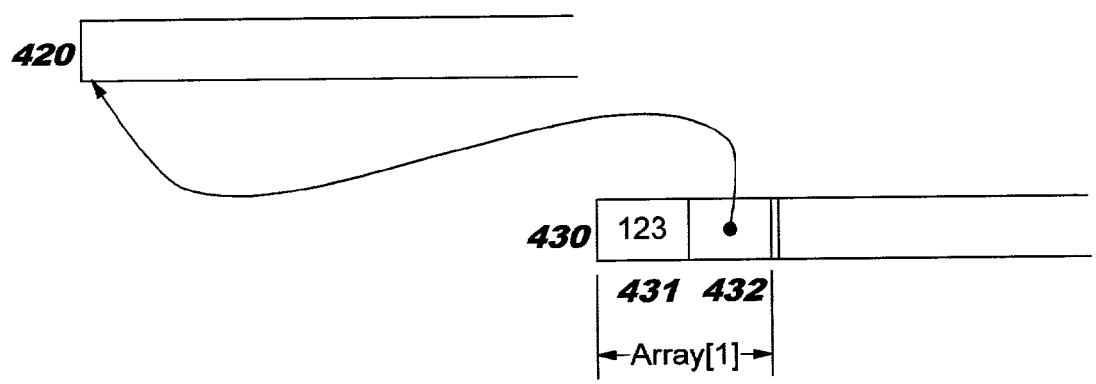
FIG. 4C
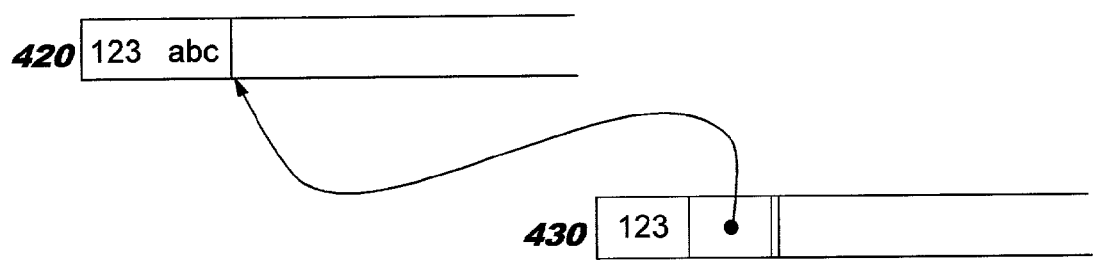

TECHNIQUE FOR EFFICIENT DATA TRANSFER WITHIN A VIRTUAL NETWORK

BACKGROUND OF THE INVENTION

1. Field of the Invention

The present invention relates to computer systems, and deals more particularly with methods, systems, and computer program products for improving the efficiency of data transfer within interconnected components of a virtual network, and in particular components of a single physical computing device.

2. Description of the Related Art

Use of distributed computing environments such as e-commerce computing (which may alternatively be referred to as e-business computing) has skyrocketed in recent years, due in large part to the popularity of the public network known as the Internet and the subset thereof known as the World Wide Web, or simply "Web". Other distributed computing environments include intranets and extranets, where intranets are typically designed as computing networks for internal use by a business and extranets are typically designed for use by a business' suppliers and/or customers. Large-scale distributed computing networks often have very critical operational constraints which must be met, in spite of very high demands on the computing resources in the network, in order to maintain customer satisfaction. Examples of these operational constraints include highly available systems, secure access and secure transactions, and very fast turnaround time for responding to incoming messages.

Providing computing hardware and software to meet these requirements is an on-going challenge. One prior art approach to optimizing response time for messages is directed toward minimizing the input/output ("I/O") overhead for a host computer or server (referred to hereinafter as a "host" or "host computer") that is sending outbound data packets. If the host computer has a large volume of packets to send over a given interface, the I/O overhead can be minimized by delaying the sending of the packets until a certain threshold number of packets has been accumulated. Typically, these packets are stored in a contiguous packing buffer until the threshold is reached, after which all the buffered packets may be transmitted to the interface at once using a single I/O operation. Another way to minimize the I/O overhead is to copy multiple relatively small packets into a packing buffer, until reaching some threshold buffer size, and then to transmit the entire buffer in a single I/O operation.

When the host computer transmits packets on a local area network ("LAN"), it typically sends the buffered groups of packets to a protocol-specific interface, such as a Token Ring interface, an Ethernet interface, an FDDI (Fiber-Distributed Data Interface) interface, etc., where this interface then transfers the packets to the corresponding hardware adapter for actual transmission onto the physical LAN medium. The host may perform Address Resolution Protocol ("ARP") processing before sending the buffered packets to the interface, where the ARP processing locates the Media Access Control ("MAC") address associated with the next-hop Internet Protocol ("IP") address—assuming that IP addressing is used within the system—from each packet, and puts this MAC address into the outbound packet header for use as the packet is routed through the network to its destination. Because the packets in the buffer may be intended for multiple destinations on the LAN, when they have been packed into a buffer by the sending host before transmission to the adapter, the adapter must locate each IP packet (using the packet headers in the buffer) and separately put each packet onto the LAN so it will arrive at the correct destination.

Alternatively, a technique which is commonly known as "ARP offload" may be used, where the ARP processing is done by the adapter rather than by the sending host. In this case, the host provides the next-hop IP address in each packet header, and part of the processing performed by the adapter for each packet includes using this next-hop IP address to locate the proper MAC address, and putting the MAC address into the packet header before putting the packets onto the physical LAN medium.

However systems have been developed in recent years in which the packet transmission process is optimized by memory-to-memory exchange rather than transmitting the packets onto an actual communications network. An example of such a system is the IBM® eServer zSeries 900, or z900, a mainframe computer designed specifically for the needs of e-business computing environments. The z900 allows thousands of virtual servers or hosts to operate within one physical device, enabling it to meet the large-scale computing needs of customers such as application service providers, Internet service providers, and technology hosting companies. The z900 uses an enhanced I/O subsystem for dealing with its large number of processors, thereby providing efficient host-to-host connectivity. A "HiperSockets™" feature of the z900 allows for interchanging data between the multiple operating system images within a z900 server (such as from one Linux™ image to another, or between a Linux image and a z/OS image, where "z/OS" is a new 64-bit operating system developed by IBM), without requiring any physical cables or an external network connection. Instead, the HiperSockets feature enables TCP/IP ("Transmission Control Protocol/Internet Protocol") messages to be exchanged using memory-to-memory transfers for packet transmission, effectively putting a virtual network or virtual LAN within the z900 system. Because no external network transmission is required for these exchanges, significant performance improvements can be realized. ("IBM" is a registered trademark, and "HiperSockets" is a trademark, of the International Business Machines Corporation. "Linux" is a trademark of Linus Torvalds.)

The HiperSockets technology is described in commonly-assigned U.S. Pat. No. 6,854,021 (Ser. No. 09/677,454, filed Oct. 2, 2000), entitled "Communications Between Partitions a Logically Partitioned Computer", which is hereby incorporated herein by reference and is referred to herein as "the related invention". The term "logical partition" refers to an area of memory or storage allocated for use by a single instance of the operating system, and is commonly known as an "LPAR". An example computing system using LPARs is illustrated in FIG. 1, which may be a z900 computer. The shared physical memory 110 in this example is divided into a number of logical partitions 112a-112n, each partition having discrete servers 114a-114n, respectively, labeled in FIG. 1 as discrete server 1 to discrete server n. Each discrete server preferably has a TCP/IP layer 116a-116n, respectively, for handling the transmission protocols for transmitting data in I/O operations for networks. Under each TCP/IP layer 116a-116n is a device driver 118a-118n, respectively, for driving data transmissions between the discrete servers. As disclosed in the related invention, the device drivers 118 drive data exchanges (shown generally by send arrows 122a-122n and receive arrows 120a-120n) between the LPARs, rather than driving actual I/O devices. A common lookup table 124 in the hardware systems area ("HSA") 125 of memory 110 defines the discrete servers, as disclosed in the related invention.

When sending data to a HiperSockets device driver for transmission to another server (i.e. another host) located on the virtual LAN, existing systems send all data to this single interface, in a similar manner to that which has been described above for prior art LAN interfaces, even though the packets may be addressed to multiple destinations on the virtual LAN. Each packet has a packet header, and data in this header indicates the destination on the virtual LAN. HiperSockets therefore essentially provides a "virtual ARP offload" function, in that it takes a next-hop IP address from each packet header and uses that address to locate the appropriate destination on the virtual LAN to which to deliver the packet.

If the sending host packs multiple packets into a single packing buffer, as in the prior art LAN approach described above, then the HiperSockets driver on the virtual LAN must parse through each packet and evaluate contents of its packet header to determine the correct destination for delivering the packet. While this approach is satisfactory from a functional perspective, it is inefficient because there is actually no need for the adapter to build any MAC headers for the outbound packets which are to be transmitted on the virtual LAN: no network devices will be routing these packets among different machines, and thus there is no MAC address to be used.

Accordingly, what is needed is a technique whereby data transfer within a virtual communications network can be improved.

SUMMARY OF THE INVENTION

An object of the present invention is to define improved data transfer techniques within a virtual communications network.

Another object of the present invention is to provide this improvement by minimizing IP address look-up operations for packets destined for the virtual network. another object of the present invention is to provide this improvement by altering the outbound packing buffer allocation strategy.

A further object of the present invention is to provide a technique for improving efficiency of data transfers in systems having multiple logical partitions.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides methods, systems, and computer program products for improving efficiency of data transfer in virtual networks. In a first preferred embodiment, this technique comprises: allocating one or more outbound packing buffers for each of a plurality of particular network addresses; packing outbound data packets into appropriate ones of the outbound packing buffers, according to a network address within a header of each outbound data packet; and transmitting each outbound packing buffer onto the virtual network in a single transmission operation. Each of the particular network addresses is preferably a next-hop address on the virtual network, and the network address within the header is preferably a next-hop address inserted into the header by a sending host. The virtual network may be defined by a plurality of logical partitions within a single computing device.

In a second preferred embodiment, the outbound packing buffers are logically divided into a plurality of frames, the frames being associated with second network addresses. The packing operation in this embodiment comprises packing the outbound data packets into selected frames of selected ones of the outbound packing buffers when a header of the outbound data packet to be packed specifies the first network address and the second network address which correspond to the selected outbound packing buffer and the selected frame. The first network address preferably comprises a next-hop address on the virtual network and the second network address preferably comprises a final destination address (which may or may not be on the virtual network). The host which receives the transmitted data can then determine whether to forward the outbound data packets by inspecting the first packet in each frame.

The present invention may also be used advantageously in methods of doing business, for example to provide improved Web hosting services or more efficient Internet Service Provider offerings.

The present invention will now be described with reference to the following drawings, in which like reference numbers denote the same element throughout.

BRIEF DESCRIPTION OF THE DRAWINGS

FIGS. 4A through 4H provide examples used to illustrate operation of preferred embodiments of the present invention.

DESCRIPTION OF PREFERRED EMBODIMENTS

Figure 1:
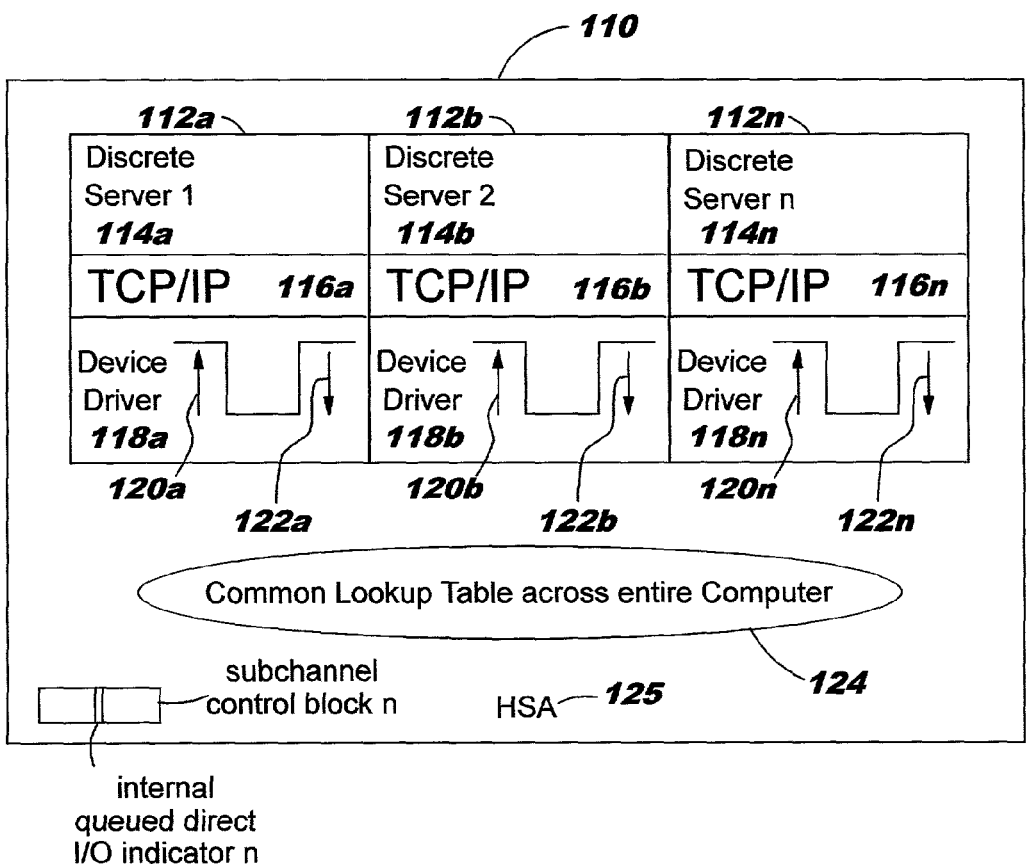
FIG. 1 is a schematic diagram of a single computer of the prior art having shared physical memory and a plurality of discrete servers, where this computer may generate data packets which are processed according to the teachings of the present invention.

The present invention defines techniques for improving the efficiency of data transfer in systems designed according to a virtual network architecture and/or systems which support multiple operating system images in distinct logical partitions. Note that while preferred embodiments are described herein in terms of a particular mainframe computer (i.e. the z900) which supports a particular operating system, and the HiperSockets feature of this computer, this is for purposes of illustration and not of limitation. Furthermore, references herein to use of the present invention for processing IP packets is for purposes of illustration and for conveying details of implementing the present invention. The disclosed techniques may be used advantageously in other computing environments, including with other computers, other operating systems, and other networking protocols, without deviating from the scope of the present invention.

In a first preferred embodiment, a host which sends packets onto a virtual LAN manages a set of packing buffers, and separates outbound packets into appropriate ones of these packing buffers based on the next-hop IP address for each packet. Note that this host, which is referred to herein as a "sending host", is not necessarily the host which originally generates the packets. (The sending host determines the next-hop IP address for a particular packet by using the destination IP address from the packet's IP header to access a routing table for a route corresponding to that destination, using techniques which are known in the art and which do not form part of the present invention.) By separating the outbound packets in this manner, a particular packing buffer accumulates packets destined for a single next-hop address. When an appropriate threshold (which may depend on the current workload of the system) is reached to indicate that buffered packets should be transmitted (such as expiration of a timer, reaching a counter of buffered packets, filling a packing buffer, etc.), the host sends one or more of the packing buffers to the device driver, using a single I/O operation, for routing the buffer(s) onto the virtual LAN. Preferably, a "SIGA" (Signal Adapter) instruction is used for this sending of packing buffers, where the data sent on this instruction equates to a single "transmission unit or frame" for which the SIGA command is designed. The device driver can then quickly transmit the entire unit (comprising one or more packets) to the target host, and only needs to look at the next-hop IP address of the first packet in each packing buffer in order to determine where to send the entire set of packets in that packing buffer or frame. This approach makes it transparent to the device driver how many packets the host is sending, and shields the device driver from having to inspect each packet header in order to send the buffered packets, thereby greatly improving the efficiency of the packet forwarding process. (The Signal Adapter instruction is defined in commonly-assigned U.S. Pat. No. 6,345,325, Ser. No. 09/252,728, filed Feb. 19, 1999, which is entitled "A Method and Apparatus for Ensuring Accurate and Timely Processing of Data Using a Queued Direct Input-Output Device".)

Because the sending host builds IP headers on each packet, the eventual receiving (target) host can parse through the header of each received packet while completing its processing of each packet in the inbound buffer, with no loss of information.

In a second preferred embodiment, the above-described technique may optionally be further optimized by basing the packing algorithm not only on the next-hop IP address, but on the final destination IP address as well. Preferably, each packing buffer for outbound data is logically subdivided by the sending host on particular boundaries when using this optimization, and packets are accumulated within these logical subdivisions for particular final destinations. A boundary such as a 4K page (i.e. 4,096 bytes) may be used, where the 4K size (or another appropriate size) is selected to correspond to a frame size of the computing system. In this manner, the packing buffer still represents data to be sent to a particular next-hop IP address, while each 4K page within that buffer contains packets for the same final destination IP address. This enables each receiving (intermediate) host to quickly scan through an inbound buffer and separate its own traffic from traffic that must be routed to a different target host, without having to individually inspect the header of each packet in the buffer. Instead, the receiving host checks the destination address of the first packet in each 4K page or frame. If the IP header contains this host's IP address, then the host accepts all of the packets in this frame for further processing; otherwise, the entire frame is forwarded to the next hop.

First and second preferred embodiments will now be described in more detail with reference to the logic depicted in the flowcharts of FIGS. 2 and 3, making reference to the examples in FIGS. 4A-4H. The logic in FIGS. 2 and 3 assumes that a sending host has data packets ready for transmission, and iterates through these packets sequentially.

Figure 2:
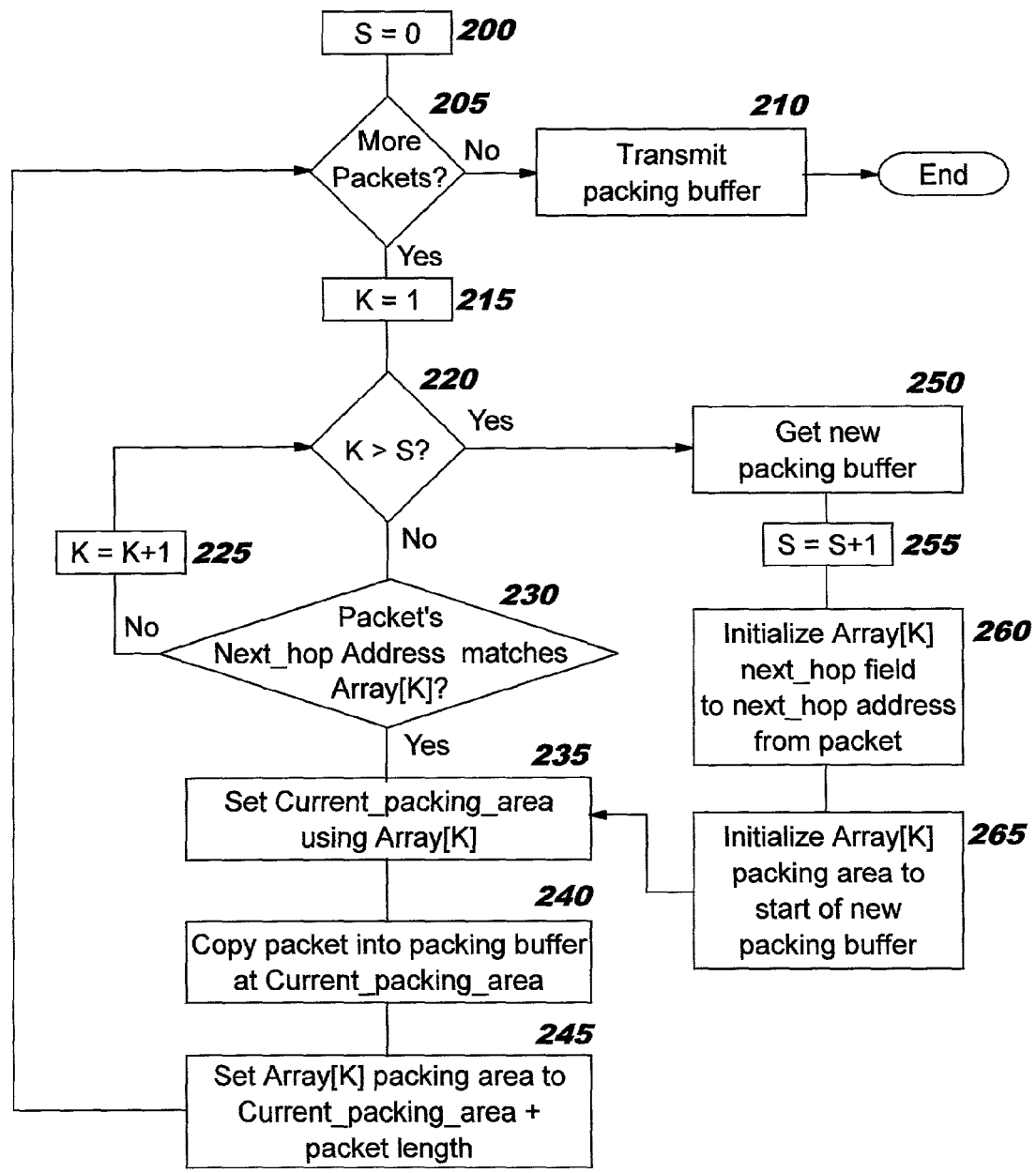
FIGS. 2 and 3 provide flowcharts depicting logic which may be used to implement preferred embodiments of the present invention.

Referring to FIG. 2, in a first preferred embodiment, the packing algorithm begins at Block 200 by initializing a variable "S" to zero. Variable S counts how many elements in an array referred to herein as "Array" are valid. Block 205 tests to see if more packets are ready to be packed for transmission. If not, then the packing buffer may be transmitted at Block 210, after which the processing of FIG. 2 is (at least temporarily) complete. Otherwise, the packing operation continues at Block 215 where a variable "K" is initialized to one. Variable K is used to index through Array.

Block 220 tests to see if variable K has a greater value than variable S. If so, then there are no more packing buffers to be checked in the current iteration, indicating that no existing buffer is available for packing the current packet. The processing for this situation uses Blocks 250-265, as will now be described.

Reference is now made to the five example packet fragments in FIG. 4A, which are used to illustrate operation of the packing algorithm in FIG. 2. (As will be obvious, this sample data is provided for purposes of illustration, and is not meant to reflect actual addressing conventions or actual packet contents.) On a first iteration through this logic, packet 405 is the current packet being processed; variable S=0; and variable K=1. Therefore, control transfers from Block 220 to Block 250 (because no packing buffer is available for packing packet 405). At Block 250, a new packing buffer is obtained. Variable S is incremented (Block 255), indicating that an additional element of Array is now valid, and Variable K now indexes to this new Array element. In the example of FIG. 4A, S=1 and K=1 at this point, and buffer 420 of FIG. 4B has been obtained.

Block 260 then initializes the next-hop field of Array[K] to the next-hop address from the current packet. FIG. 4B shows that the next-hop value 431 of Array[1] 430 is set to "123", which is the value shown in column 401 of FIG. 4A for packet 405. Block 265 initializes the packing area field of Array[K] to the point to the start of the new outbound packing buffer. FIG. 4B shows that Array[1]'s packing area field 432 points to outbound buffer 420. Control then transfers to Block 235 of FIG. 2.

In Block 235, a variable "Current_packing_area" is set using the current packing area field value from the K-th element of Array. In the example, Current_packing_area thus points to outbound packing buffer 420, in accordance with field 432 of Array[1]. Block 240 copies the current packet into the packing buffer at the location pointed to by Current_packing_area. This is shown by the new values in buffer 420 of FIG. 4C, where the current packet 405 in the example has the content "123abc". Block 245 then sets the K-th Array element's packing area field to point to the new location computed as (Current_packing_area+the length of the current packet). FIG. 4C therefore shows Array 430 having its packing area field 432 changed to point to the next empty location in packing buffer 420. Control then returns to Block 205 to determine whether there are more packets to be packed.

In the example, the second iteration through the logic of FIG. 2 uses packet 406 as the current packet, and has S=1. At Block 215, K is reset to 1. The "No" branch will therefore be taken from the test in Block 220.

Figure 4D:
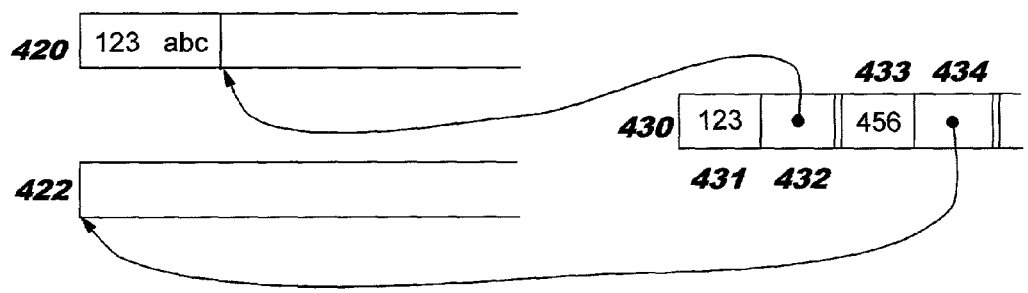
Figure 4E:
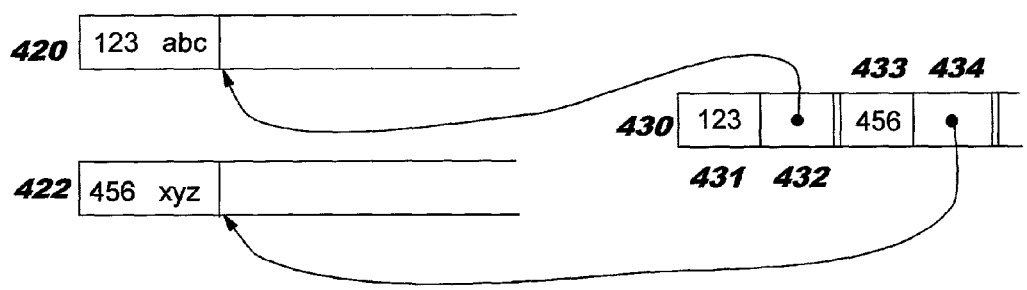

When the test in Block 220 has a negative result, this indicates that there are still more outbound packing buffers to inspect, and control transfers to Block 230. Block 230 checks to see if the next-hop address of the current packet being processed matches a saved next-hop address in the K-th element of Array. In the example, this test has a negative result because Array[1] contains the value "123" in its next-hop field while the current packet has the next-hop value "456". Control therefore passes to Block 225, which increments K and returns to the test in Block 220. At this point in the example, the test in Block 220 has a positive result, indicating that there are no more packing buffers which might contain packets destined for the next-hop address of "456". Therefore, the logic in Blocks 250-265 will be executed again. A second packing buffer 422 is obtained during this processing, as shown in FIG. 4D. Variable S is incremented to 2. K is already set to 2, from the processing of Block 225. Array[2]

has its next-hop address 433 set to "456" and its packing area field points to the start of packing buffer 422. Upon transferring to the processing of Blocks 235-245 (which have been described in detail above with reference to the processing of the first packet 405), the Current_packing_area is set to also point to the start of packing buffer 422; the current packet is copied into this packing buffer; and the value of the packing area field in Array[2] is changed to point to the next empty location within packing buffer 422, with the result as shown in FIG. 4E.

Figure 4F:
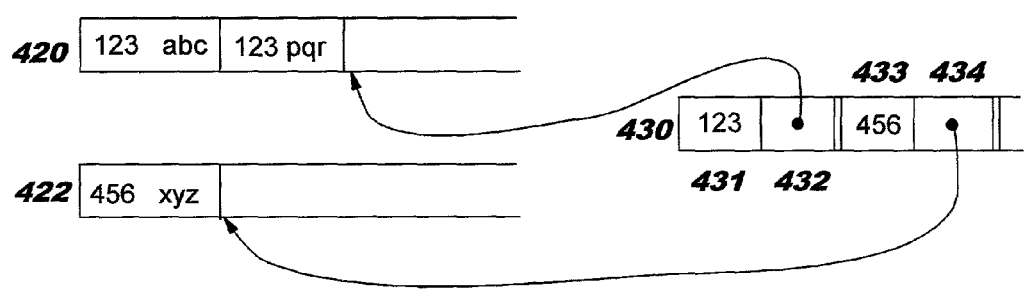

After completing the processing of the second packet 406, control again returns to Block 205 to begin processing packet 407. S is now 2, and K is again reset to 1 at Block 215. K is not greater than S, and control therefore reaches Block 230, which compares the next-hop value "123" from packet 407 to the next-hop value in Array[1]. Because these next-hop values match, processing continues at Block 235 which uses the packing area field 432 from Array[1] to set the value of Current_packing_area. The contents of packet 407 are then copied into packing buffer 420 starting at the next available position (Block 240), and the pointer in packing area field in Array[2] is moved beyond this new content (Block 245), with the result as shown in FIG. 4F. Control then returns again to Block 205.

Figure 4G:
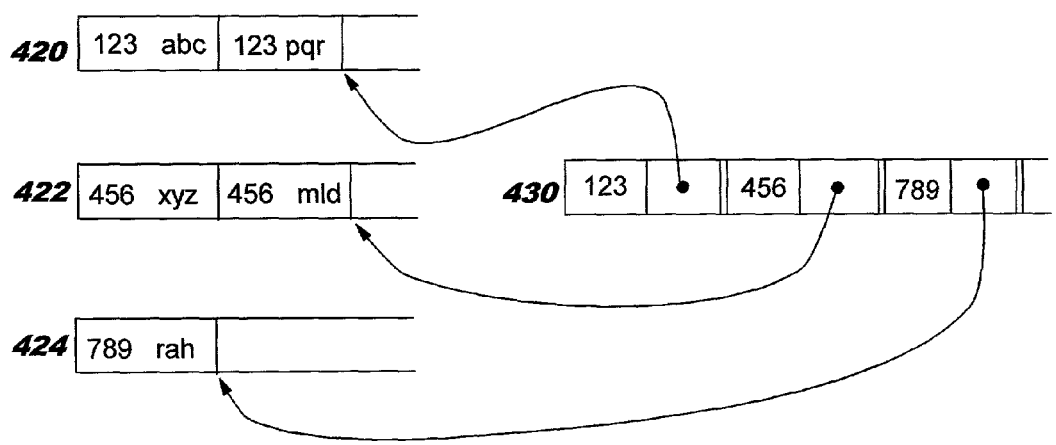
Figure 4H:
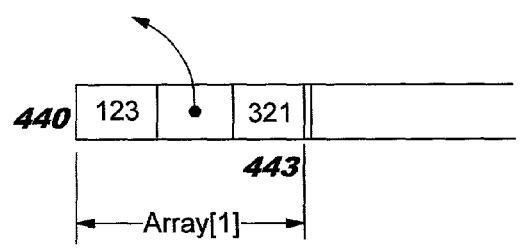

The processing of this logic for the example packets 408 and 409 will not be described in detail, as it will be obvious to the reader. The results are shown in FIG. 4G, Assuming that no more packets are available or otherwise ready for transmission, the test in Block 205 will have a negative result. The packing buffers 420, 422, 424 are then sent to the device driver for a memory-to-memory transmission at Block 210. Upon re-entering the logic of FIG. 2 to process additional outbound packets, all variables are re-initialized and all packing buffers are obtained anew.

Figure 3:
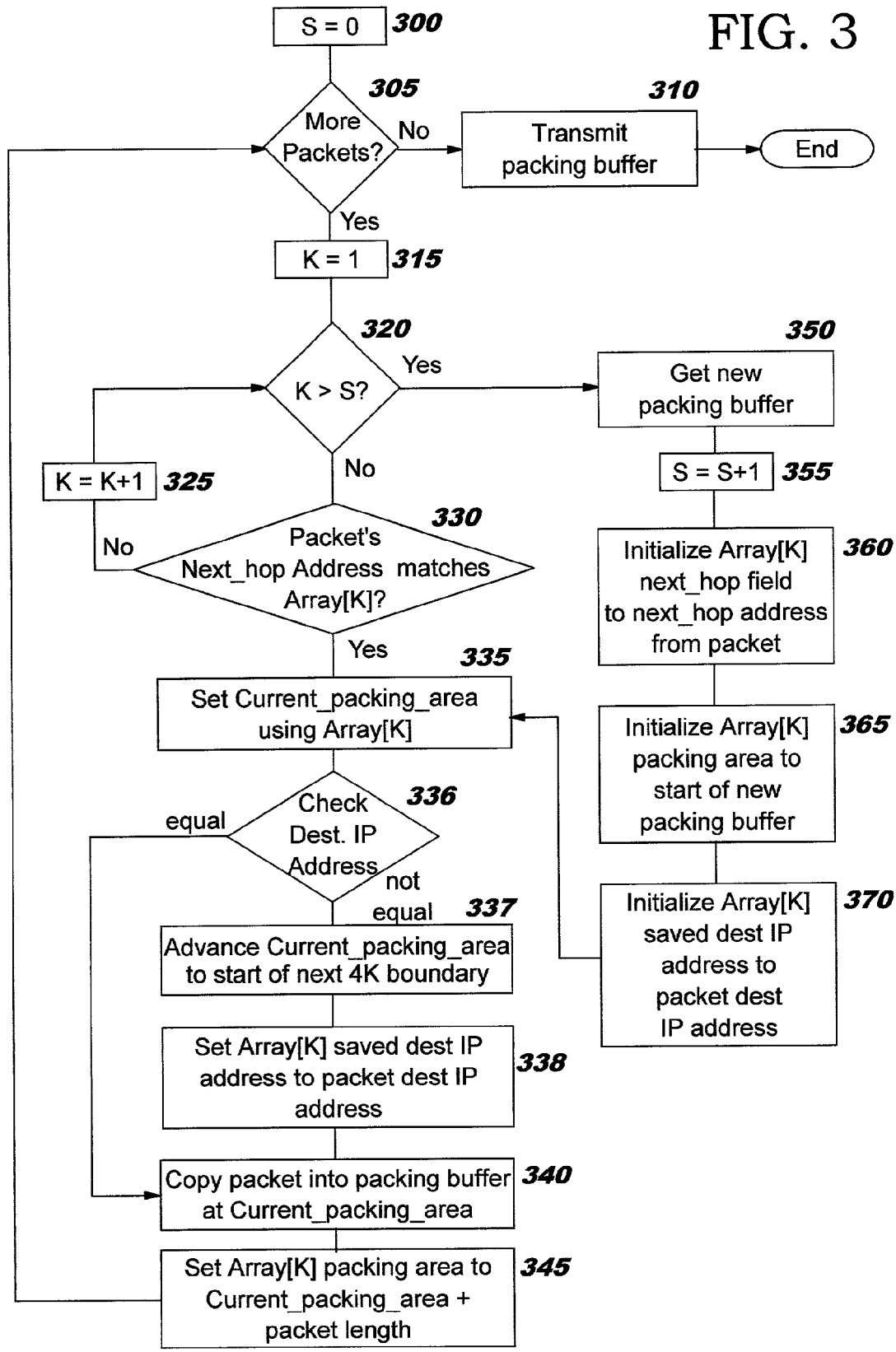

Turning now to FIG. 3, logic which may be used to implement the above-described second preferred embodiment is illustrated. This logic in Blocks 300-370 of FIG. 3 corresponds generally to Blocks 200-265 of FIG. 2, and differs from that of FIG. 2 only in the addition of Blocks 336, 337, 338, and 370. After determining in Block 330 that a packing buffer having a next-hop address equal to that of the current packet is available, and setting Current_packing_area to point to the next empty position in that buffer at Block 335, additional processing is performed in Block 336 to determine whether the final destination of the current packet matches the final destination in the 4K frame to which Current_packing_area now points. This test uses an additional field in each array element, shown in the Array 440 of FIG. 4H as 443 (which assumes that packet 401 of FIG. 4A was directed to a final destination having the address "321"). This additional array field remembers the destination address for the 4K frame to which the packing area field of each array element currently points. This destination address field of each array element is originally set during the processing of Block 370, after a packing buffer was newly obtained for a next-hop address for which no existing packing buffer was found. If the destination address matches during the test of Block 336, then control transfers to Block 340 where the current packet is inserted into the packing buffer at the next available location within the 4K frame (as has been described above with reference to inserting the current packet into the next available location of the overall packing buffer at Block 240 of FIG. 2). Otherwise, processing continues at Block 337, which advances the Current_packing_area value to the next 4K frame within the packing buffer for the appropriate next-hop address, and Block 338 then updates the saved destination address field (see 443 of FIG. 4H) of Array[K] to remember the current packet's destination address.

It will be obvious to one of skill in the art that the logic depicted in FIGS. 2 and 3 omits certain details which are not relevant to the novel concepts of the present invention, such as ensuring that Array contains enough space to enable adding a new element for some value of K, ensuring that the packing buffers have not overflowed (and obtaining a new packing buffer if an overflow does occur), and so forth. The manner in which the logic can be augmented with these details, which use techniques that are well known in the art, will be readily apparent.

When the packing buffers created according to the above teachings are transmitted, the receiving (target and intermediate) hosts are preferably adapted to knowing that the efficient packing and transmission technique of the present invention is in use, thereby enabling those hosts to avoid parsing each individual packet header for packet routing purposes. The receiving hosts may obtain this knowledge in various manners. Preferably, all sending hosts on the virtual LAN implement at least the first preferred embodiment described above. In that case, it is only necessary for receiving hosts to know whether a particular sending host uses the enhanced technique of the second preferred embodiment. One way in which this might be known is for each sending host to transmit a special flag within the packet headers to indicate this information. Or, a system-wide convention might be adopted, requiring that either all sending hosts implement the first preferred embodiment or the second preferred embodiment, but not allowing a mix. As another example, a message exchange might be used to convey this information, such as by transmitting a special protocol message to inform a recipient that the second preferred embodiment is in use (or whether or not it is in use) at a particular sending host. Note that there are no requirements placed on receiving hosts for conveying information as to which embodiment it supports: the receiving host simply inspects the first packet header of the received buffer, or the first packet header of each 4K frame within the received buffer, depending on which preferred embodiment it supports.

As has been demonstrated, the present invention provides advantageous techniques for improving efficiency of data transfer within virtual networks. Use of either preferred embodiment may result in significantly faster packet delivery.

As will be appreciated by one of skill in the art, embodiments of the present invention may be provided as methods, systems, and/or computer program products. Accordingly, the present invention may take the form of an entirely hardware embodiment, an entirely software embodiment, or an embodiment combining software and hardware aspects. Furthermore, the present invention may take the form of a computer program product which is embodied on one or more computer-usable storage media (including, but not limited to, disk storage, CD-ROM, optical storage, and so forth) having computer-usable program code embodied therein.

The present invention has been described with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, embedded processor or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart and/or block diagram block or blocks.

While preferred embodiments of the present invention have been described, additional variations and modifications in those embodiments may occur to those skilled in the art once they learn of the basic inventive concepts. In particular, while the preferred embodiments have been described with reference to IP and TCP/IP, this is for purposes of illustration and not of limitation. Therefore, it is intended that the appended claims shall be construed to include the described preferred embodiments and all such variations and modifications as fall within the spirit and scope of the invention.

What is claimed is:

1. A method of transferring data in a virtual network, comprising: allocating one or more outbound packing buffers for each of a plurality of particular network addresses; packing outbound data packets into appropriate ones of the outbound packing buffers, according to a network address within a header of each outbound data packet; and transmitting each outbound packing buffer onto the virtual network in a single transmission operation; wherein each of the particular network addresses is a next-hop address on the virtual network.

2. The method according to claim 1, wherein the network address within the header is a next-hop address inserted into the header by a sending host.

3. The method according to claim 1, wherein the virtual network is defined by a plurality of logical partitions within a single computing device.

4. A method of transferring data in a virtual network, comprising:
    allocating one or more outbound packing buffers for each of a plurality of first network addresses, wherein each outbound packing buffer is logically divided into a plurality of frames, the frames being associated with second network addresses;
    packing outbound data packets into selected frames of selected ones of the outbound packing buffers, when a header of the outbound data packet to be packed specifies the first network address and the second network address which correspond to the selected outbound packing buffer and the selected frame; and
    transmitting each outbound packing buffer onto the virtual network in a single transmission operation.

5. The method according to claim 4, wherein the first network address comprises a next-hop address on the virtual network and the second network address comprises a final destination address.

6. The method according to claim 4, further comprising:
    receiving a set of frames from the transmitting each outbound packing buffer onto the virtual network in a single transmission operation; and
    determining whether to forward the outbound data packets which are packed in each frame by inspecting a first packet of the frame.

7. A system for transferring data in a virtual network, comprising: processor, wherein the processor is configured to perform: allocating one or more outbound packing buffers for each of a plurality of particular network addresses; packing outbound data packets into appropriate ones of the outbound packing buffers, according to a network address within a header of each outbound data packet; and transmitting each outbound packing buffer onto the virtual network in a single transmission operation; wherein each of the particular network addresses is a next-hop address on the virtual network and the network address within the header is a next-hop address inserted into the header by a sending host.

8. The system according to claim 7, wherein the virtual network is defined by a plurality of logical partitions within a single computing device.

9. A system for transferring data in a virtual network, comprising: processor, wherein the processor is configured to perform: allocating one or more outbound packing buffers for each of a plurality of first network addresses, wherein each outbound packing buffer is logically divided into a plurality of frames, the frames being associated with second network addresses; packing outbound data packets into selected frames of selected ones of the outbound packing buffers, when a header of the outbound data packet to be packed specifies the first network address and the second network address which correspond to the selected outbound packing buffer and the selected frame; and transmitting each outbound packing buffer onto the virtual network in a single transmission operation.

10. The system according to claim 9, wherein the first network address comprises a next-hop address on the virtual network and the second network address comprises a final destination address.

11. The system according to claim 9, further comprising: receiving a set of frames from the transmission; and determining whether to forward the outbound data packets which are packed in each frame by inspecting a first packet of the frame.

12. A computer program product for transferring data in a virtual network, the computer program product embodied on one or more computer readable storage device and comprising: computer readable program code that is configured to allocate one or more outbound packing buffers for each of a plurality of particular network addresses; computer readable program code that is configured to pack outbound data packets into appropriate ones of the outbound packing buffers, according to a network address within a header of each outbound data packet; and computer readable program code that is configured to transmit each outbound packing buffer onto the virtual network in a single transmission operation, wherein each of the particular network addresses is a next-hop address on the virtual network and the network address within the header is a next-hop address inserted into the header by a sending host.

13. The computer program product according to claim 12, wherein the virtual network is defined by a plurality of logical partitions within a single computing device.

14. A computer program product for transfer transferring data in a virtual network, the computer program product embodied on one or more computer readable storage device and comprising: computer readable program code that is configured to allocate one or more outbound packing buffers for each of a plurality of first network addresses, wherein each outbound packing buffer is logically divided into a plurality of frames, the frames being associated with second network addresses; computer readable program code that is configured to pack outbound data packets into selected frames of selected ones of the outbound packing buffers, when a header of the outbound data packet to be packed specifies the first network address and the second network address which correspond to the selected outbound packing buffer and the selected frame; and computer readable program code transmitting that is configured to transmit each outbound packing buffer onto the virtual network in a single transmission operation.

15. The computer program product according to claim 14, wherein the first network address comprises a next-hop address on the virtual network and the second network address comprises a final destination address.

16. The computer program product according to claim 14, further comprising:

computer readable program code that is configured to receive a set of frames from the transmission; and computer readable program code that is configured to determine whether to forward the outbound data packets which are packed in each frame by inspecting a first packet of the frame.

17. The method according to claim 4, wherein the virtual network is defined by a plurality of logical partitions within a single computing device.

18. The system according to claim 9, wherein the virtual network is defined by a plurality of logical partitions within a single computing device.

19. The computer program product according to claim 14, wherein the virtual network is defined by a plurality of logical partitions within a single computing device.

20. A method according to claim 1 wherein the virtual network is provided by a web hosting service or Internet Service Provider to end users.

21. A method according to claim 4 wherein the virtual network is provided by a web hosting service or Internet Service Provider to end users.

\* \* \* \* \*